US007547737B2

(12) United States Patent
Kochvar et al.

(10) Patent No.: US 7,547,737 B2
(45) Date of Patent: *Jun. 16, 2009

(54) RAPIDLY DISSOLVABLE POLYMER FILMS AND ARTICLES MADE THEREFROM

(75) Inventors: Kelly Ann Kochvar, Cincinnati, OH (US); Heidi Simonne Mariette Soyez, Ostend (BE); Peter Jens Forth, Brussels (BE); Jean-Pol Boutique, Gembloux (BE); Ruth Anne Wagers, Hamilton, OH (US); Errol Hoffman Wahl, Cincinnati, OH (US); Matthew Lawrence Lynch, Mariemont, OH (US); Wayne Robert Fisher, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 383 days.

This patent is subject to a terminal disclaimer.

(21) Appl. No.: 11/176,025

(22) Filed: Jul. 7, 2005

(65) Prior Publication Data

US 2005/0244444 A1 Nov. 3, 2005

Related U.S. Application Data

(63) Continuation of application No. 10/060,567, filed on Jan. 30, 2002, now Pat. No. 6,946,501.

(60) Provisional application No. 60/265,221, filed on Jan. 31, 2001.

(51) Int. Cl.
C08K 9/10 (2006.01)
C08L 29/04 (2006.01)
C11D 3/37 (2006.01)

(52) U.S. Cl. ................ 523/210; 524/383; 524/386; 524/803; 510/276; 510/277

(58) Field of Classification Search ................ 523/210; 524/383, 386, 803; 510/276, 277
See application file for complete search history.

(56) References Cited

U.S. PATENT DOCUMENTS

| 2,162,618 | A | | 6/1939 | Izard |
| 3,113,674 | A | | 12/1963 | Kiefer et al. |
| 3,186,869 | A | | 6/1965 | Friedman |
| 3,218,776 | A | | 11/1965 | Cloud |
| 3,240,712 | A | * | 3/1966 | Schulerud et al. ........... 510/298 |
| 3,322,674 | A | | 5/1967 | Friedman |
| 3,360,470 | A | | 12/1967 | Wixon |
| 3,413,229 | A | | 11/1968 | Bianco et al. |
| 3,634,260 | A | | 1/1972 | Pickin |
| 3,695,989 | A | | 10/1972 | Albert |
| 3,892,905 | A | | 7/1975 | Albert |
| 3,947,971 | A | | 4/1976 | Bauer |
| 4,018,688 | A | | 4/1977 | Pracht et al. |
| 4,082,678 | A | | 4/1978 | Pracht et al. |
| 4,108,600 | A | | 8/1978 | Wong |
| 4,119,604 | A | | 10/1978 | Wysong |
| 4,481,326 | A | | 11/1984 | Sonenstein |
| 4,544,693 | A | | 10/1985 | Surgant |
| 4,557,852 | A | | 12/1985 | Schulz et al. |
| 4,588,080 | A | | 5/1986 | Ginn |
| 4,610,799 | A | | 9/1986 | Wilsberg et al. |
| 4,656,216 | A | | 4/1987 | Müller et al. |
| 4,680,916 | A | | 7/1987 | Ginn |
| 4,692,494 | A | | 9/1987 | Sonenstein |
| 4,747,976 | A | | 5/1988 | Yang et al. |
| 4,801,636 | A | | 1/1989 | Smith et al. |
| 4,806,261 | A | | 2/1989 | Ciallella et al. |
| 4,851,141 | A | | 7/1989 | Demangeon et al. |
| 4,929,367 | A | | 5/1990 | Thomas et al. |
| 4,942,973 | A | | 7/1990 | Bowie |
| 4,972,017 | A | | 11/1990 | Smith et al. |
| 4,982,467 | A | | 1/1991 | Mizusawa et al. |
| 5,078,301 | A | | 1/1992 | Gladfelter et al. |
| 5,198,198 | A | | 3/1993 | Gladfelter et al. |
| 5,234,615 | A | | 8/1993 | Gladfelter et al. |
| 5,272,191 | A | | 12/1993 | Ibrahim et al. |
| 5,399,272 | A | | 3/1995 | Swartley et al. |
| 5,474,689 | A | | 12/1995 | Laughlin et al. |
| 5,500,138 | A | | 3/1996 | Bacon et al. |
| 5,863,887 | A | | 1/1999 | Gillette |
| 5,972,870 | A | | 10/1999 | Anderson |
| 6,020,425 | A | | 2/2000 | Wang et al. |
| 6,258,767 | B1 | | 7/2001 | Jacques et al. |
| 6,281,183 | B1 | | 8/2001 | Harbour |
| 6,296,516 | B1 | | 10/2001 | Kuo et al. |
| 6,946,501 | B2 | * | 9/2005 | Kochvar et al. ............. 523/210 |

(Continued)

FOREIGN PATENT DOCUMENTS

BR 9103288 A 7/1991

(Continued)

Primary Examiner—Tae H Yoon
(74) Attorney, Agent, or Firm—Mark A. Charles; Julie A. McConihay; Kim William Zerby

(57) ABSTRACT

A film-forming composition for use in preparing water-soluble films that are rapidly dissolving under cold water conditions, the composition comprising a water soluble polymer material such as polyvinyl alcohol and a principal solvent, typically diol(s) or derivative of a diol. Films made from the film-forming compositions may be used to encapsulate a variety of compositions for subsequent release into an aqueous medium. Encapsulated compositions can include various laundry detergents and additives, fabric care compositions such as fabric softening compositions and dishwashing detergents among others. When used to encapsulate compositions, the solvent system used in the film-forming composition will have at least one common solvent material as the solvent system used in the encapsulated composition to improve film dissolution and to prevent problems associated with solvent migration.

13 Claims, No Drawings

FOREIGN PATENT DOCUMENTS

| | | |
|---|---|---|
| EP | 0 148 170 | 7/1985 |
| EP | 0 593 952 | 4/1994 |
| EP | 1 180 536 A1 | 2/2002 |
| JP | 09272773 | 10/1997 |
| JP | 09272774 | 10/1997 |
| JP | 09272775 | 10/1997 |
| WO | WO 93/04120 | 3/1993 |
| WO | WO 94/11482 | 5/1994 |
| WO | WO 96/04336 | 2/1996 |
| WO | WO 97/03169 | 1/1997 |
| WO | WO 98/21118 | 5/1998 |
| WO | WO 99/40171 | 8/1999 |
| WO | WO 00/00577 | 1/2000 |
| WO | WO 00/06683 | 2/2000 |
| WO | WO 00/55069 | 9/2000 |
| WO | WO 01/04255 | 1/2001 |
| WO | WO 01/36577 | 5/2001 |

* cited by examiner

RAPIDLY DISSOLVABLE POLYMER FILMS AND ARTICLES MADE THEREFROM

CROSS REFERENCE TO RELATED APPLICATION

This application is a continuation of U.S. application Ser. No. 10/060,567, filed Jan. 30, 2002, now U.S. Pat. No. 6,946,501, and which claims the benefit of U.S. Provisional Application No. 60/265,221, filed Jan. 31, 2001.

FIELD OF THE INVENTION

The present invention relates to the development and use of water-soluble polymer materials and films and articles made therefrom that are readily dissolvable in cold water. The present invention is even more particularly related to the use of such polymer materials in forming water-soluble articles that contain a variety of consumer product compositions including but not limited to laundry and fabric care compositions, and other compositions that are commonly used and/or diluted in cold water.

BACKGROUND OF THE INVENTION

Water-soluble films and their use in forming water-soluble articles are well known in the art.

U.S. Pat. No. 3,186,869, issued Jan. 29, 1962, COATED FILM FOR LAUNDRY PACKAGE, and U.S. Pat. No. 3,322,674, issued Jun. 26, 1964, LAUNDRY PACKAGE, disclose water-soluble films and laundry articles made therefrom which contain a detergent and chlorine based bleaching agent. The water-soluble films in these references are internally coated with a wax or other material to prevent the contents of the package from interacting with the film material and degrading its solubility characteristics.

U.S. Pat. No. 3,413,229, issued Nov. 26, 1968, POLYVINYL ALCOHOL COMPOSITIONS, teaches the use of a plasticizer in PVA compositions that are used to form laundry packets for detergents and/or bleaches in order to maintain the solubility characteristics of the film after storage.

U.S. Pat. No. 3,892,905, issued Jul. 1, 1975, COLD WATER SOLUBLE PLASTIC FILM, discloses a cold water soluble film that comprises a combination of polymers having U.S. Pat. No. 3,892,905, issued Jul. 1, 1975, COLD WATER SOLUBLE PLASTIC FILM, discloses a cold water soluble film that comprises a combination of polymers having different molecular weights. The lowest molecular weight polymer suggested is about 21,000.

U.S. Pat. No. 4,119,604, issued Oct. 10, 1978, POLYVINYL ALCOHOL COMPOSITIONS FOR USE IN THE PREPARATION OF WATER-SOLUBLE FILMS, discloses a cold water soluble film that comprises a low molecular weight PVA and a medium molecular weight PVA. The "low" and "medium" molecular weights are not identified but are merely described in terms of the viscosity of a solution containing the polymer.

U.S. Pat. No. 4,481,326, issued Nov. 6, 1984, WATER-SOLUBLE FILMS OF POLYVINYL ALCOHOL AND POLYVINYL PYRROLIDONE, discloses a cold water soluble film for packaging various products. The film comprises hydrolyzed polyvinylacetate alcohol and polyvinyl pyrrolidone. Specific data concerning the dissolution rate of the film in cold water is not disclosed.

U.S. Pat. No. 4,544,693, issued Oct. 1, 1985, WATER-SOLUBLE FILM, discloses a water-soluble film that reportedly dissolves in water as cold as 5° C. The film is composed of polyvinyl alcohol, polyvinyl pyrrolidone, ethoxylated alkyphenol, and polyhydric alcohol. No dissolution data concerning the claimed film is provided.

U.S. Pat. No. 4,692,494, issued Sep. 8, 1987, WATER-SOLUBLE FILMS OF POLYVINYL ALCOHOL AND POLYACRYLIC ACID AND PACKAGES COMPRISING SAME, discloses a cold water soluble film made of a blend of PVA and polyacrylic acid.

U.S. Pat. No. 4,765,916, issued Aug. 23, 1988, POLYMER FILM COMPOSITION FOR RINSE RELEASE OF WASH ADDITIVES, discloses water-soluble laminate film that comprises at least one methylcellulose layer of hydroxybutyl methylcellulose (HBMC) blended with hydroxypropyl methylcellulose (HPMC) and at least one layer of polyvinyl alcohol incorporating a cross-linking agent. The solubility of the laminate is intended to be pH rather than temperature dependent.

U.S. Pat. No. 4,801,636, issued Jan. 31, 1989, RINSE SOLUBLE POLYMER FILM COMPOSITION FOR WASH ADDITIVES discloses a water-soluble film that is made from a blend of polyvinyl alcohol and alkyl cellulose and has a metalloid oxide component to inhibit the dissolution of the film in an alkaline wash but allow dissolution in the less alkaline rinse. U.S. Pat. No. 4,972,017, issued Nov. 20, 1990, is a divisional of U.S. Pat. No. 4,801,636 that is directed to an article made from the film claimed in the '636 patent.

U.S. Pat. No. 5,272,191, issued Dec. 21, 1993, COLD WATER SOLUBLE FILMS AND FILM-FORMING COMPOSITIONS discloses water-soluble film made from known water-soluble film-forming polymers, and a second component that is a water insoluble cellulose material. The cellulose is rendered insoluble preferably through internal or external cross linking reactions.

SUMMARY OF THE INVENTION

The present invention provides a film-forming composition for forming a cold water soluble film, the composition comprising:

from about 50% to about 99.9% of a water-soluble polymer material and from about 0.1% to about 50% of a principal solvent, wherein a film formed from the film-forming composition will dissolve in a beaker of water at a temperature below about 68° F. with agitation, in less than about 5, preferably less than about 4, still more preferably less than about 3 and even more preferably less than about 2 minutes.

The present invention further provides for a water-soluble film formed from the film-forming composition as well as an article wherein a composition to be dispensed into an aqueous medium is enclosed or encapsulated in the cold water soluble film.

DETAILED DESCRIPTION OF THE INVENTION

All percentages, ratios and proportions herein are by weight, unless otherwise specified. All temperatures are in degrees Celsius (° C.) unless otherwise specified. All documents cited are incorporated herein by reference in their entireties. Citation of any reference is not an admission regarding any determination as to its availability as prior art to the claimed invention.

As used herein, "comprising" means that other steps and other ingredients which do not affect the end of result can be added. This term encompasses the terms "consisting of" and "consisting essentially of".

As used herein, "cold water conditions" is intended to refer to an environment where there is sufficient water to dissolve the film, i.e. the concentration of film polymer does not exceed its solubility limit in cold water, and where the temperature of the water is less than about 68° F. and more preferably is less than about 50° F. It is anticipated that the improvements in dissolution achieved with the films and articles of the present invention will likely be seen under warm and hot water conditions as well.

As used herein, "rapidly dissolving" is intended to refer to the disintegration and subsequent dissolution of the polymer film in less than about 5 minutes, preferably less than about 3 minutes and more preferably less than about 2 minutes after the film or an article made therefrom is placed in cold water conditions.

Film-Forming Compositions

The film-forming compositions of the present invention comprise water-soluble film-forming polymer material and principal solvent. Optionally, the film-forming compositions may contain a variety of adjunct ingredients that are well known to those in the film-forming art. Each of these components can be varied according to the levels desired in a given cold water soluble film.

A. Water-Soluble Film-Forming Polymers

Any water-soluble, film-forming polymer, or mixtures of polymers, may be used in the film-forming compositions of the present invention. The polymers usually are vinyl polymers, including homopolymers and copolymers, having functionality rendering the polymers water-soluble, such as hydroxyl and carboxyl groups. Typical water-soluble polymers include at least one of polyvinyl alcohol, partially hydrolyzed polyvinyl acetate, polyvinyl pyrrolidone, alkyl celluloses such as methylcellulose, ethylcellulose, propylcellulose and derivatives thereof, such as the ethers and esters of alkyl celluloses, and acrylic polymers such as water-soluble polyacrylates, polyacrylamides, and acrylic maleic anhydride copolymers. Suitable water-soluble polymers further include copolymers of hydrolyzed vinyl alcohol and a non-hydrolyzable anionic comonomer, such as described in U.S. Pat. No. 4,747,966 to Yang et al, cited above.

It will be evident that a wide variety of film-forming water-soluble polymer materials, including synthetic and natural polymers, and mixtures thereof, as described in standard textbooks on the subject and in the patent literature may be used to advantage. For example, in addition to the U.S. patents cited above, Japanese unexamined patent applications JP 01317506A published Dec. 22, 1989, and JP 60061504A published Apr. 9, 1985, describe water-soluble films of polyvinyl alcohol, polyvinyl pyrrolidone, methylcellulose, cellulose acetate, polyethylene oxide, gelatin, partially saponified polyvinyl alcohol, CMC, dextrin, starch, hydroxyethyl cellulose, agar, pectin, and others for the packaging of process chemicals such as sodium sulfate and solid agricultural chemicals. Similarly, British Patent 2,191,379 granted Dec. 16, 1987, describes the packaging of animal feed supplements in a plastic film of polyvinyl alcohol, polyvinyl acetate, ethylene/vinyl acetate copolymer or an alkylcellulose ester. The disclosures of all of the above cited patents and patent applications are incorporated herein by reference.

Particularly preferred film-forming polymers are polyvinyl alcohol, vinyl alcohol/vinyl acetate copolymers, polyvinyl pyrrolidone, gelatin, and mixtures of any of the foregoing. Polymer films comprising polyvinyl alcohol can be prepared that are particularly rapidly dissolvable at colder temperatures i.e. less than about 50° F. or less than about 40° F. Further, polyvinyl alcohols having varying average molecular weights (i.e. mean weights of the molar masses) such as from about 6,000 to about 78,000 or higher may be used. Likewise, polyvinyl alcohol having varying degrees of hydrolysis may also be used to advantage. Preferably, such polymers are less than about 90%, more preferably less than about 85%, and still more preferably less than about 80% hydrolyzed, but will be more than about 60% and more preferably at least about 70% hydrolyzed. Blends of water-soluble polymers having different degrees of hydrolysis may also be used to advantage. Other preferred film-forming polymers include polyethylene oxide, polyvinyl pyrrolidone, hydroxypropyl methylcellulose and hydroxyethylcellulose.

Blends of water-soluble film-forming polymers may also be used to advantage. Blends offer additional advantages in that rapidly dissolving films can be produced with good mechanical properties for subsequent handling and converting into manufactured articles. For instance, a blend containing at least two types of water-soluble polymers that have disparate molecular weights, can be used to prepare film that is rapidly dissolving under cold water conditions. Preferably, such blends contain at least one type of polymer that has a molecular weight greater than about 50,000, preferably greater than about 60,000 and even more preferably greater than about 70,000, and a second polymer or mixture of polymers having an average molecular weight of less than about 30,000, more preferably less than about 15,000, and even more preferably less than about 10,000.

More specifically, a blend of at least one polyvinyl alcohol having a molecular weight of about 78,000 and higher and a second polyvinyl alcohol about 6,000 or lower has been found to produce a rapidly dissolving film under cold water conditions. A low percentage of the higher molecular weight polyvinyl alcohol, namely, less than about 50% preferably less than about 40%, and more preferably less than about 30%, will produces a film with adequate strength for converting into sachets or coatings. A higher percentage of higher molecular weight polyvinyl alcohol, namely, greater than about 50%, preferably greater than about 60% and more preferably greater than about 70%, will provide the improved strength and elasticity that is desired for vacuum forming operations, but it should be noted that such higher percentages of high MW polymers are typically accompanied by increasingly higher dissolution times. Blends of high and low molecular weight polymers at ratios of 80/20, 60/40, and 50/50 mixtures of low to high molecular weight polyvinyl alcohol can be evaluated for specific applications.

By way of example, a rapidly dissolving film can be prepared from a blend of polyvinyl alcohol that comprises from about 60% to about 95% of polyvinyl alcohol of an average molecular weight from about 3,000 to about 30,000 and from about 5% to about 40% of polyvinyl alcohol of an average molecular weight from about 30,000 to about 200,000. The degree of hydrolysis in the polyvinyl alcohol blend is preferably less than about 90 mol %, more preferably less than about 85% mol %, and still more preferably less than about 80 mol %. The film formed from this composition can dissolve in a beaker of water at a temperature below about 68° F. in less than about 5 minutes with agitation.

In addition, blends of different types of polymer materials can also be formulated and prepared to produce the films of the present invention. For instance, ratios of 80/20, 60/40 and 50/50 with mixes of polyvinyl alcohol and polyvinyl pyrrolidone, polyvinyl alcohol and polyethylene oxide, polyvinyl alcohol and hydroxyethyl cellulose, polyvinyl pyrrolidone and hydroxyethyl cellulose, polyvinyl pyrrolidone and polyethylene oxide, and polyethylene oxide and hydroxyethyl cellulose, hydroxypropyl methylcellulose and polyvinyl alcohol, can be used to advantage.

B. Principal Solvent

The film-forming compositions of the present invention comprise less than about 50%, preferably from about 5% to about 35%, more preferably from about 8% to about 25%, and even more preferably from about 10% to about 20%, of the principal solvent, by weight of the composition. Said principal solvent is selected to minimize the time required for the water-soluble film to disintegrate and dissolve under cold water conditions. Dissolution data on films with and without a principal solvent is presented below following the section entitled "Solubility Test Method."

The suitability of any principal solvent for the formulation of the film-forming composition herein is surprisingly selective considering solubility, film mechanical properties, and compatibility with the composition to be encapsulated by the film. Suitable solvents can be selected based upon the octanol/water partition coefficient (P) of the solvent itself, and other solvent-polymer interactions. The principal solvent may also consist of a mixture of these materials, which may result in an improvement in both film solubility and mechanical properties.

The octanol/water partition coefficient of a principal solvent is the ratio between its equilibrium concentration in octanol and in water. The partition coefficients of the principal solvent ingredients of this invention are conveniently given in the form of their logarithm to the base 10, ClogP.

The logP of many ingredients has been reported; for example, the Pomona92 database, available from Daylight Chemical Information Systems, Inc. (Daylight CIS), Irvine, Calif., contains many, along with citations to the original literature. However, the logP values are most conveniently calculated by the "CLOGP" program, also available from Daylight CIS. This program also lists experimental logP values when they are available in the Pomona92 database. The "calculated logP" (ClogP) is determined by the fragment approach of Hansch and Leo (cf., A. Leo, in Comprehensive Medicinal Chemistry, Vol. 4, C. Hansch, P. G. Sammens, J. B. Taylor and C. A. Ramsden, Eds., p. 295, Pergamon Press, 1990, incorporated herein by reference). The fragment approach is based on the chemical structure of each ingredient, and takes into account the numbers and types of atoms, the atom connectivity, and chemical bonding. The ClogP values, which are the most reliable and widely used estimates for this physicochemical property, are preferably used instead of the experimental logP values in the selection of the principal solvent ingredients which are useful in the present invention. Other methods that can be used to compute ClogP include, e.g., Crippen's fragmentation method as disclosed in J. Chem. Inf. Comput. Sci., 27, 21 (1987); Viswanadhan's fragmentation method as disclose in J. Chem. Inf. Comput. Sci., 29, 163 (1989); and Broto's method as disclosed in Eur. J. Med. Chem.—Chim. Theor., 19, 71 (1984).

The principal solvents herein are selected from those having a ClogP of from about −2 to about 2.6, preferably from about −1 to about 1, more preferably from about 0.15 to about 0.64, and even more preferably from about 0.40 to about 0.60, and said principal solvent preferably being asymmetric. Solvents that have a low molecular weight and are biodegradable are also desirable for some purposes. The more asymmetric solvents appear to be very desirable, although highly symmetrical solvents, having a center of symmetry such as 1,4-cyclohexanedimethanol, are also preferred.

Examples of preferred principal solvents include alcohols, and in particular polyols such as diols. Specific non-limiting examples of preferred principal solvents include 1,4-butanediol, 1,3 butanediol and 1,2-hexanediol, 2,2,4-trimethylpentanediol, ethoxylates of 2,2,4-trimethylpentanediol, 2-ethyl 1,3 hexanediol, and 1,4 cyclohexanedimethanol, and 1,2 cyclohexanedimethanol. For molecules exhibiting isomerism, both the trans and cis forms can function as principal solvents. An extensive description of materials suitable for use as principal solvents and as "simple" solvents are disclosed in U.S. Pat. No. 6,323,172, issued Nov. 27, 2001 to Trinh, et al., which is incorporated herein by reference.

In selecting the principal solvent for incorporation into a water-soluble film, for example a polyvinyl alcohol film, it is important to consider the composition of the material to be encapsulated by the film. In particular, it is known that solvents in the composition may migrate into the film over time. This can cause a loss of integrity to the film by affecting its physical and mechanical properties. For example, the film and articles made therefrom, e.g., a pouch, sachet or bead, can become soft losing the ability to maintain their shape and/or even their structural integrity. This migration of materials from the composition into the film may also cause the composition inside the article to become cloudy, viscous and/or exhibit poor dispersion properties due to the loss of solvent. Likewise, solvents and/or plasticizers in the film can migrate into the composition encapsulated by the film. This migration can also alter the encapsulated material causing it to become less desirable or effective in performing its intended function.

To avoid issues relating to solvent migration, it is preferred that the principal solvent (or mixture of solvents) in the film composition comprise at least one common solvent that is present in the encapsulated composition. For example, if the composition to be encapsulated is a fabric enhancer product such as is described in WO 01/85892 A1, which preferably comprises 1,4-cyclohexanedimethanol, then preferably the film composition should also comprise 1,4-cyclohexanedimethanol to mitigate against solvent migration and the deleterious effects that can result therefrom.

As noted above, the incorporation of a principal solvent in the film forming composition can also improve the dissolution properties of a film. It is well known that specific materials can render a film insoluble delaying or preventing the disintegration and opening of water-soluble articles made from the film, and/or inhibiting the complete dissolution of the film material after the article has opened. There is particular concern that when the contents encapsulated in a water-soluble are released to the aqueous medium, those materials may inhibit the complete dissolution of the remaining film material. However, it has been found that the use of at least one principal solvent in the film material that is the same as one of the solvents used in the encapsulated composition will promote faster dissolution of the remaining film material. Compatibility between the film comprising a principal solvent and the encapsulated composition may be determined by using the beaker test method that is described below.

Suitable solvents can also include low molecular weight alcohols, polyols, alcohol ethoxylates and the like. In addition, hydrotropes such as sodium toluene sulfonate, sodium butyrate, sodium cumene sulfonate, sodium xylene sulfonate, and other hydrotropic materials can also be used to improve the cold water solubility of the film composition.

C. Adjunct Ingredients

The film-forming polymer may be further modified with various reagents commonly employed in the film preparation art such as plasticizers, surfactants, anti-block agents, antifoamers, defoamers, biocides, perfumes, colorants, opacifiers, pearlescing agents, and the like.

To help provide flexibility to the film a plasticizer may be included in the film-forming composition. The amount of plasticizer can range from 0% to about 40%, by weight of the film-forming polymer. As shown in the examples below, it is preferred that the film composition have between about 2% to about 5% of a plasticizer. Suitable plasticizers include glycerine, urea, poly(alkylene glycols) such as ethylene glycol, trimethylene glycol, tetramethylene glycol, pentamethylene glycol, hexamethylene glycol, propylene glycol, diethylene glycol, and triethylene glycol, alkane diols such as 1,2 propanediol, 1,3 propanediol, 2,3-butanediol, 1,4-butanediol, 1,3-butanediol, 1,5-pentanediol, and 1,6 hexanediol; alkanolamines such as triethanolamine; alkanolamine acetates such as triethanolamine acetate; and alkanolacetamides such as ethanol acetamide. While glycerine is preferred for most purposes, selection of an appropriate plasticizer is made according to the ultimate required properties of the film. It is important to note that some materials have dual function serving both as a principal solvent and as plasticizer. Thus, several materials that are identified above as principal solvents are also described herein as suitable plasticizers.

Representative of surfactants conventionally employed in the production of water-soluble films include water-soluble anionic surfactants such as carboxylate soaps, alkylarylsulfonates, alkanesulfonates, alpha-olefinsulfonates, fatty alcohol sulfates, and oxo-alcohol ether sulfates described in the technical literature including U.S. Pat. No. 3,634,260 cited above and others. A preferred anionic surfactant class comprises alkali metal salts of sulphated fatty alcohols containing about 10 to about 18 carbon atoms, such as sodium lauryl sulfate and sodium stearyl sulfate. Suitable nonionic surfactants include the alkylphenol ethoxylates, fatty or oxo-alcohol polyethylene glycol ethers, ethylene oxide-propylene oxide block copolymers, fatty alcohol polygylcol ethers and ethoxylated fatty alcohols. To a lesser extent amphoteric or cationic surfactants may also be employed in the film-forming compositions of the invention, such as the alkyl betaines (sulfonated or nonsulfonated), quarternary ammonium salts and amine oxides. The surfactants may be used in amounts normally effective to assist in dispersion of water-soluble polymers, such as about 1% to about 30% by weight of total film-forming composition.

Antifoam agents include the silicon polymers and defoamers include tallow compounds.

Useful biocides comprise any of the many known materials having efficacy against bacteria and other degrading organisms but which are non-toxic to handlers and to mammals or persons in the environment of use. Such agents and the principles of selection are well known to those skilled in the art. Suitable biocides include quarternary ammonium salts such as alkyl(C8-C18)di(lower alkyl)benzylammonium chloride and dialkyldimethylammonium bromide.

Procedure for Making Polymer Films

A 250 ml beaker, stir bar and stirring hot plate can be used to make the polymer films in the laboratory hood. First, the desired components are weighed out on a balance to obtain the desired percentage levels into the beaker. Distilled water and a stir bar are added to the beaker. The beaker is placed on the hot plate to stir until all the components are completely dissolved. Finally, the solution is poured onto teflon plates to let the water evaporate off until the film is formed. This evaporation method usually takes about 1 to about 3 days. The dried film preferably has a thickness between about 20 microns and about 80 microns.

| | Film-forming Composition Examples | | |
|---|---|---|---|
| Sample Film | PVA** (M.W. 6,000, 80% hydrolysis) | PVA** (M.W. 78,000, 88% hydrolysis) | % CHDM |
| 1 | 80% (~2.0 g) | 0 | 20% (~0.5 g) |
| 2 | 47% (~1.3 g) | 33% (~0.9 g) | 20% (~0.5 g) |

*PVA = polyvinyl alcohol starting material from Polysciences, Inc.
**Dissolved in about 100 ml of water. Film thickness is ~75 microns

| | Film Examples | | | | | |
|---|---|---|---|---|---|---|
| Film | PVA (M.W. 6,000, 80% hydrolysis) | PVP | POE | CHDM | 1,6-hexanediol | Glycerine |
| 1 | 50% | 30% | 0 | 18% | 0 | 2% |
| 2 | 40% | 0 | 40% | 0 | 18% | 2% |

PVP = polyvinyl pyrrolidone
POE = polyethylene oxide
CHDM = 1,4-cyclohexanedimethanol The film-forming compositions of the invention can be made into films of varying thickness on a commercial scale using conventional methods and techniques such as solution casting and thermo-forming techniques. Films prepared from the film-forming compositions of the present invention are preferably in the range of about 20 to about 100 microns in thickness, and more preferably between about 20 microns and about 80 microns.

In addition, the films of the present invention can be used effectively in the preparation of laminated or other multi-layered films. For example, an encapsulate formed from a two layer film can comprise of an inner layer made from a high molecular weight polyvinyl alcohol and/or a low degree of hydrolysis resin to provide a barrier layer in contact with a material or composition that is encapsulated in the film. A second outer layer comprising a low molecular weight and/or high degree of hydrolysis polyvinyl alcohol resin and a principal solvent may be desirably to provide fast dissolution at the encapsulate's surface. In addition to compositional differences, the thickness of various layers would likely differ; the inner layer having a thickness in the range of about 10 to about 40 microns and the outer layer having a thickness in the range of about 30 to about 60 microns. Further, it may be desirable to provide a layer of material intermediate between film layers to aid in the handling and processing of multi-layer films.

In solution casting, the compositions are cast on a plate or belt using a film applicator where they are allowed to dry. The films can then be vacuum-dried, followed by removal from the coating plate/belt. Casting techniques are described in greater detail in U.S. Pat. No. 5,272,191 issued Dec. 21, 1993 to Ibrahim, et al. which is incorporated herein by reference.

Films may also be prepared by a melt process, which typically involves mixing the components together with sufficient water to allow the polymer and principal solvent to melt at a temperature below their decomposition temperatures. The blended material is fed to an extruder, extruded under tension through an appropriate die, cooled with air and taken up by an appropriate collection device. For making films, a tubular film can be made with cool air being blown through the center of the tube to both cool the film and to impart a biaxial stress to the film. Extrusion processes can also be used to make other shaped articles by using appropriate dies and molds. Examples of such thermo-forming processes are described in greater detail in U.S. Pat. No. 5,646,206 issued Jul. 8, 1997 to Coffin, et al., said patent being incorporated herein by reference.

Solubility Test Method

To determine the solubility of polymer films in cold water (40° F.) a simplified beaker test method was employed. More specifically, the beaker test method was used to determine the amount of time it takes for the film to break up into pieces (disintegration) and to dissolve completely (dissolution) by placing the film sample in a beaker containing water at 40° F. with constant agitation.

The methodology consisted of cutting a sample of each film about 2 in. by 2 in. square and placing it in a 250 ml beaker containing about 100 g of cold water. A stirring bar was added and the beaker placed on a Corning® magnetic stir/hot plate, model number PC-420. The film and water were stirred at a constant low speed (setting=3) until the piece of film appeared to be completely dissolved visually. In determining film solubility in a medium that does not allow visual inspection of the film (i.e. a fabric softening composition), the contents of the beaker were poured through a strainer having openings of about 1 mm in diameter to catch any portions of the film that were not completely dissolved. When remnants of the film were caught in the strainer, the remnants were transferred back to the beaker and the stirring continued until the film completely dissolved. When the beaker contents pass through the strainer without leaving residue in the strainer, dissolution was complete. The dissolution time required for the film to be able to pass through the strainer without leaving residue was then recorded.

The following table provides film dissolution data concerning different films with and without a principal solvent as well as data concerning the interaction of the encapsulate composition with the film material and the inhibitory effect on the dissolution of the film. For films dissolved in pure water and films dissolved in a fabric softening composition, the dissolution times are dramatically shortened by the incorporation of a principal solvent into the film-forming composition. For films dissolved in pure water, the dissolution time of a film with a principal solvent were only about 25% to about 27% of the dissolution times for films that did not comprise a principal solvent. Similarly, for films dissolved in a fabric softening composition, the dissolution time of a film with a principal solvent were about 40% of the dissolution time for films that did not comprise a principal solvent.

Film Dissolution

| Film | Hydrolysis (%) | MW | 1,4-CHDM (%) | Film Dissolution Time in 40° F. Water (min:sec) | Film Dissolution Time in Fabric Softener* (min:sec) |
|---|---|---|---|---|---|
| PVA | 80 | 6,000 | 20 | 0:45 | 0:56 |
| PVA | 80 | 6,000 | 0 | 2:44 | 2:20 |
| PVA | 50/50 mix of 80% & 88% | 50/50 mix of 6,000 & 78,000 | 20 | 1:15 | 4:00 |
| PVA | 50/50 mix of 80% & 88% | 50/50 mix of 6,000 & 78,000 | 0 | 5:00 | 10:00 |

*Downy Enhancer ® available from The Procter & Gamble Company

Articles

Films made of the film-forming compositions of the present invention have a variety of useful applications. They are useful as coatings, adhesives, and in particular are useful in forming water-soluble articles such as pouches for dispensing pre-measured and/or hazardous substances. By way of example, pouches and their manufacture are described in additional detail in U.S. Pat. No. 4,801,636, issued Jan. 31, 1989 to Smith, et al. and U.S. Pat. No. 6,281,183, issued Aug. 28, 2001 to Harbour, both of which are incorporated herein by reference. Controlled release matrices, carriers or coatings that are water-soluble also have numerous applications such as the application of pharmaceutical preparations to the skin for transdermal delivery. Biodegradable materials that are carrier matrices such as tablets or encapsulation materials are also contemplated.

The range of materials that can be encapsulated and sealed within the films of the present invention is very broad and includes virtually any composition which is functional in a cold water environment or which may be conveniently diluted in cold water before its intended use or application. The primary limitation is the water content of the composition. More specifically, it is difficult to encapsulate compositions that have a high water content as such compositions tend to cause premature dissolution of the films.

Specific examples of compositions that are suitable for encapsulation water-soluble film for subsequent dispersing in films include detergents and other laundry compositions including fabric softening compositions. Non-limiting examples of fabric softening compositions that may be encapsulated are described in U.S. Pat. No. 5,861,370, which issued Jan. 19, 1999 to Trinh, et al., U.S. Pat. No. 6,323,172 B2, which issued Nov. 27, 2001 to Trinh, et al. and U.S. Pat. No. 6,335,315 B2 which issued Jan. 1, 2002 to Trinh, et al., all of said patents being incorporated herein by reference. All manner of compositions that require dilution in an aqueous medium prior to use may be encapsulated in the films and articles of the present invention.

Encapsulating a composition in a water-soluble film can be accomplished using conventional techniques and equipment. Encapsulation processes that utilize vacuum forming are known in the art as described in U.S. Pat. No. 6,281,183 B2, issued Aug. 28, 2001 to Harbour, which is incorporated herein by reference. Equipment for performing such encapsulation processes is commercially available for instance from Cloud Corporation, Des Plaines, Ill.

What is claimed is:

1. A water-soluble film formed from a composition comprising:
   from about 50% to about 99.9% of a water-soluble polymer; and
   from about 0.1% to about 50% of a principal solvent
   wherein: the film comprises a thickness of from about 20 microns to about 100 microns; the principle solvent is a cyclohexanedimethanol; and the water-soluble polymer comprises a polyvinyl alcohol which is a mixture of at least two polyvinyl alcohol materials, the two polyvinyl alcohol materials having different levels of hydrolysis.

2. The water-soluble film of claim 1, wherein the water-soluble polymer comprises a mixture of two water-soluble polymers having disparate weight average molecular weights.

3. The water-soluble film of claim 2, wherein the water-soluble polymer comprises a first polymer having a weight average molecular weight greater than 50,000 and a second polymer having a weight average molecular weight of less than 30,000.

4. The water-soluble film of claim 2, wherein the ratio of high to low weight average molecular weight polymers is greater than 50/50.

5. The water-soluble film of claim 1 additionally containing a surfactant.

6. The water-soluble film of claim 1, wherein the principal solvent has a ClogP between from about −2 to about 2.6.

7. A film-forming composition for forming a cold water soluble film, the composition comprising:
- from about 60% to about 95% of polyvinyl alcohol of weight average molecular weight from about 3,000 to about 30,000;
- from about 5% to about 40% of polyvinyl alcohol of weight average molecular weight from about 30,000 to about 200,000;
- optionally, from about 0% to about 30% of a principal solvent; and wherein said polyvinyl alcohol has a degree of hydrolysis of less than 90 mol %.

8. An article of manufacture comprising:
- a releasable composition to be released into an aqueous medium; and
- a water-soluble film according to claim 1 encapsulating said releasable composition.

9. An article of claim 8, wherein the releasable composition is a fabric softening composition.

10. An article of claim 9, wherein the releasable composition and the composition from which the water-soluble film is formed comprise a common principal solvent.

11. An article of claim 8, wherein the releasable composition is a detergent for fabric or dish.

12. An article of claim 8, wherein the releasable composition comprises a perfume.

13. An article of manufacture comprising:
- a releasable composition; and
- a water-soluble film encapsulating the releasable composition;

wherein said releasable composition and said film-forming composition each comprises at least one common solvent, wherein the at least one common solvent is cyclohexanedimethanol.

* * * * *